United States Patent [19]

Mariani et al.

[11] Patent Number: 4,833,936
[45] Date of Patent: May 30, 1989

[54] STEERING COLUMN WITH ELASTIC MEANS FOR TAKING UP PLAY

[75] Inventors: Gaetano Mariani, Barlassina; Paolo Romele, Milan, both of Italy

[73] Assignee: Alfa-Lancia Industriale S.p.A., Milan, Italy

[21] Appl. No.: 162,576

[22] Filed: Mar. 1, 1988

[51] Int. Cl.⁴ .............................................. B62D 1/18
[52] U.S. Cl. ....................................... 74/493; 280/775
[58] Field of Search .................. 74/492; 403/359, 329; 280/775

[56] References Cited

U.S. PATENT DOCUMENTS

| | | | |
|---|---|---|---|
| 1,935,560 | 11/1933 | Herold | 403/329 X |
| 4,113,399 | 9/1978 | Hansen, Sr. | 403/329 |
| 4,406,641 | 9/1983 | Mallet | 74/492 X |
| 4,509,775 | 4/1985 | Arndt | 74/492 X |
| 4,674,354 | 6/1987 | Brand | 74/492 |

Primary Examiner—Peter A. Aschenbrenner
Attorney, Agent, or Firm—Charles E. Brown; Charles A. Brown

[57] ABSTRACT

A motor vehicle steering column comprises two telescopically interconnected portions, between which at least an elastic means is mounted which keeps conjugated walls of the said telescopic portions in reciprocal play-free contact in order to cancel out the rotational clearances, or play, between the said telescopic portions.

8 Claims, 2 Drawing Sheets

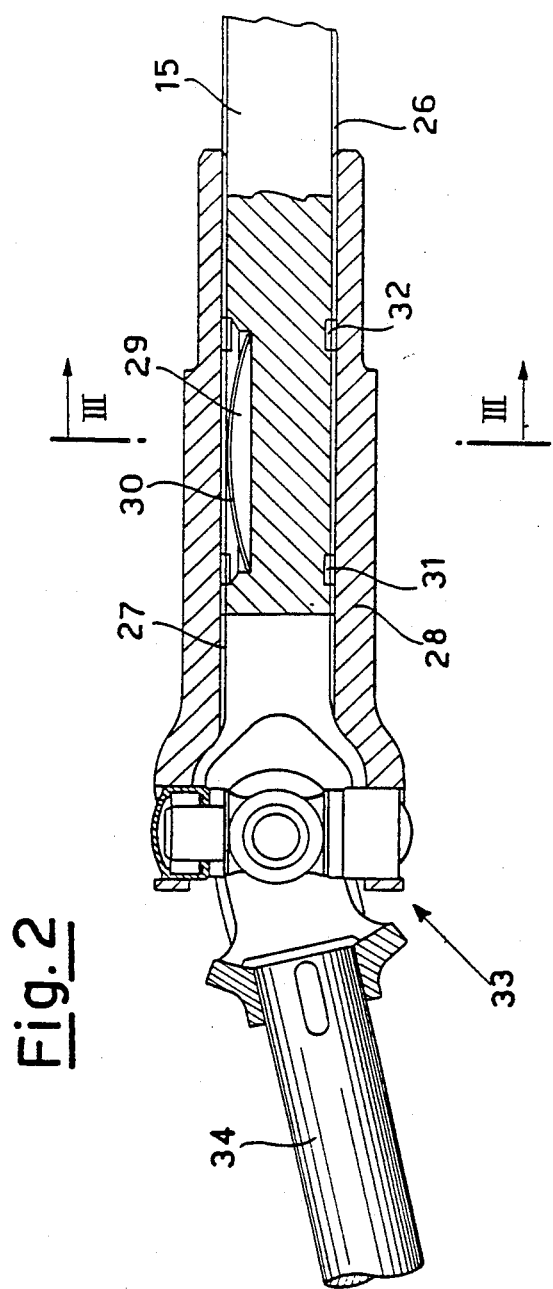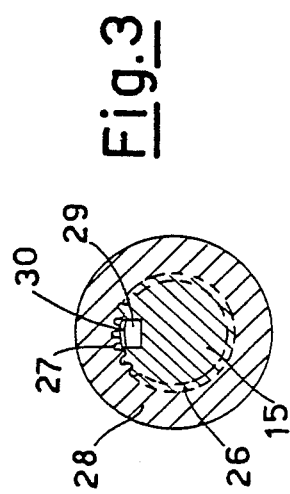

STEERING COLUMN WITH ELASTIC MEANS FOR TAKING UP PLAY

The present invention relates to an improvement to a motor vehicle steering column.

Medium-to-large sized motor vehicles are often equipped with steering components featuring devices for tilt—and height—adjustment of the steering column, and thus also of the steering wheel.

In the case of these devices the steering column is generally restrained to the vehicle bodyshell by pins, which permit its rotation, and by cursor or slides that permit its axial sliding, and can be locked in the desired position.

In some cases the steering column itself is of the telescopic type and consists of two shafts, one solid and the other hollow, which are coupled by means of a grooved-profile coupling and which are made solid, for the purposes of rotation, the one to the steering wheel and the other to the wheel steering mechanism.

Especially after lengthy operation, these sliding couplings can develop clearances or play which, if exceeding the normal range of tolerance, give rise to damaging impacts and irritating rattles.

Moreover, in the specific instance of a steering column with grooved couplings, the steering mechanism responses may in such case no longer be prompt and reliable.

In order to overcome these problems, means for taking up the operating clearance are adopted: it has for example been proposed to form in the hollow shaft a notched and therefore elastic conical bush which can be pressed against the solid shaft through an internally conical sleeve which screws onto the said hollow shaft. This prevents the clearances of the grooves coupling from producing rattles.

However, a solution of such kind is somewhat complex and costly, amongst other things because it calls for periodical regulation.

The overall object of the present invention is to overcome the drawbacks of the known art by proposing a different and effective solution which is nevertheless much more straightforward and much less costly than the known solutions, one reason for this being that it allows the clearances, or play, to be taken up automatically.

According to the invention this object is attained by embodying a motor vehicle steering column which is connected at one end to a steering wheel and at the other end to a steering mechanism of the vehicle, and which comprises telescopically interconnected portions with engagement of respective conjugated walls, characterized by the fact that between the said telescopic portions elastic means are mounted that keep the conjugated walls of the telescopic portions in reciprocal and play-free contact.

The two interconnected portions preferably consist of two shafts telescopically interconnected by a grooved-profile coupling which restrains them in a rotoid manner, and the steering column is characterized by the fact that in the vicinity of the grooved-profile coupling there are disposed pre-loaded elastic means acting radially between the conjugated surfaces of the grooved-profile coupling.

According to a preferred embodiment, the said elastic means consist of at least a pre-loaded leaf spring, advantageously housed in a hollow formed in one of the said coupled walls, to keep at least a circumferential portion of the said coupling in contact under pressure.

If the said slidingly coupled walls are formed of grooved profiles, at least a hollow is provided in one of them to house at least a pre-loaded leaf spring.

The characteristics and advantages of the invention will now be illustrated with reference to the appended drawings, in which a preferred embodiment of the invention is shown by way of illustrative and not limiting example.

In the drawings:

FIG. 2 is an enlarged view of a particular of the steering column of FIG. 1; and FIG. 3 is a sectional view taken through line III—III of FIG. 2.

Figure 1:
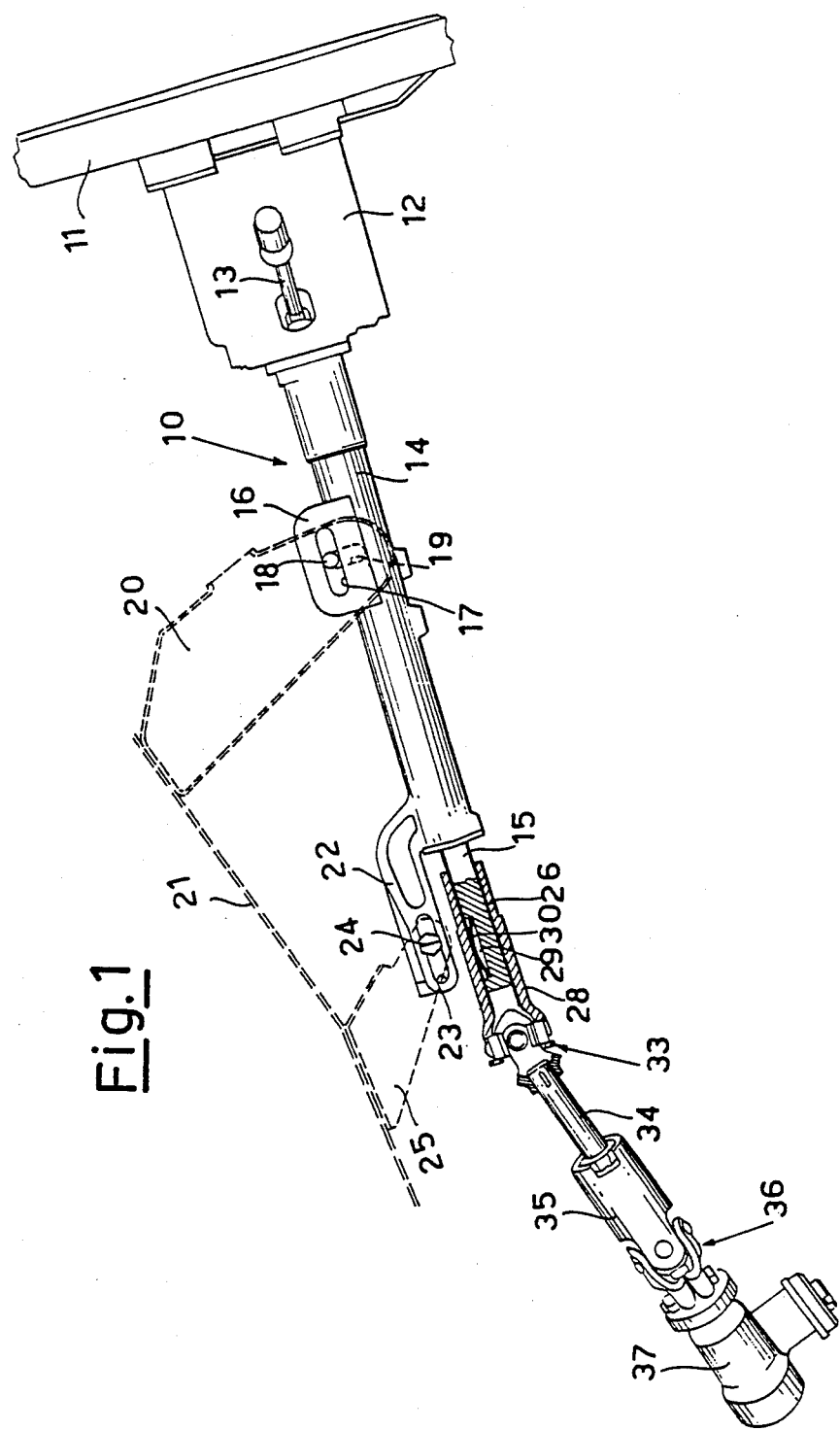
FIG. 1 is a partially sectional lateral view of a steering column provided with elastic means according to the invention.

In FIG. 1, a motor vehicle steering column is indicated overall by 10, and the steering wheel solid with the shaft 15 forming part of the steering column 10 is indicated by 11.

FIG. 1 also partially shows the cover of the steering column 10 and a stalk 13 for operating the direction indicators and vehicle lights. The numeral 14 indicates the tube which, through the agency of bearings (not shown), supports the steering column shaft 15.

The tube 14 features a bracket 16 featuring a slot 17 with which there engages a bolt 18 which in a known manner can be locked into and released from the slot 17 by a manually operated lever (not shown).

Simultaneously, the bolt 18 also engages slots, such as the one shown by the dashed surround at 19, that are formed in two sheet metal strips such as the one indicated by the numeral 20; the two strips 20 are fixed at a distance between them to the dashboard 21 and support the steering column 10 through the bolt 18.

The tube 14 also comprises a nosepiece 22 in which there is a slot 23 rotatably and slidingly supported by the pin 24 which is fixed to two sheet metal strips, such as the strip 25, secured at a distance between them to the dashboard 21. The shaft 15, which is solid, features a grooved coupling 26, more clearly seen in FIGS. 2 and 3, which is engaged by the grooved coupling 27 formed in the hollow shaft 28 which is inserted telescopically on the shaft 15.

The shaft 15 also features a hollow space 29 in which there is disposed a pre-loaded leaf spring 30; FIG. 2 illustrates the annular slots 31 and 32, which act as discharge ports for the detritus produced by the processing of the hollow space 29.

The hollow shaft 28 is connected through the U-joint 33 to the shaft 34 which is in turn connected by means of the elastic sleeve 35 and the further U-joint 36 to the pinion of the steering mechanism, not shown, which is rotatably supported by the box 37.

As illustrated in the drawings, the steering column 10, and thus also the steering wheel 11, is tilt- and heightwise adjustable in that, by releasing the bolt 18 the tube 14 supporting the shaft 15 can slide axially and rotate about the pin 24, guided by the slots 23, 17, 19 as a result of the existence of the grooved couplings 26 and 27 and the U-joints 33 and 36.

When the desired disposition has been obtained, the tube 14 is secured by locking the bolt 11 in the new position. The spring 30 has the function of automatically cancelling out any play between the grooved couplings 26 and 27, especially after long operation, thus preventing impacts between the teeth of the said coupling, and preventing rattle.

The object set out in the preamble to the specification is thus achieved in a more than ordinary straighforward and economical manner.

We claim:

1. A motor vehicle steering column connected at one end to a steering wheel and at the other end to a steering mechanism of a vehicle, said steering column comprising telescopically interconnected portions with engagement of respective conjugated walls; said interconnected portions consisting of two shafts which are telescopically interconnected, said conjugated walls of said two shafts having a grooved-profile coupling which restrains said two shafts in a rotative manner, a hollow being formed in the grooved-profile coupling of one of said conjugated walls, said hollow extending longitudinally along the grooved-profile, a pre-loaded elastic means in the form of a leaf spring being disposed longitudinally within said hollow for acting radially between said conjugated surfaces of the grooved-profile coupling in order to keep at least a circumferential portion of the grooved-profile coupling under pressure.

2. The steering column as defined in claim 1, wherein one of said two shafts is a hollow shaft and the other of said two shafts is a solid shaft.

3. The steering column as defined in claim 1, wherein said grooved-profile coupling includes at least one discharge means for removing debris from said notch.

4. The steering column as defined in claim 1, wherein said grooved-profile coupling includes a plurality of discharge means for removing debris from said notch.

5. The steering column as defined in claim 3, wherein said discharge means is an annular slot.

6. The steering column as defined in claim 4, wherein each of said plurality of discharge means is an annular slot.

7. The steering column as defined in claim 5, wherein said annular slot extends transversely to said notch.

8. The steering column as defined in claim 6, wherein each annular slot extends transversely to said notch.

* * * * *